United States Patent [19]
Bennett et al.

[11] 3,828,318
[45] Aug. 6, 1974

[54] OPERATOR PROGRAMMED NUMERICAL CONTROL SYSTEM

[75] Inventors: Charles D. Bennett, Alderwood Manor; Peter M. Coates, Kent; Robert N. Coates, Bellevue, all of Wash.

[73] Assignee: Cam Industries, Inc., Kent, Wash.

[22] Filed: Apr. 12, 1972

[21] Appl. No.: 243,242

[52] U.S. Cl.......... 340/172.5, 235/151.11, 318/568
[51] Int. Cl........................ G06f 9/06, G05b 19/42
[58] Field of Search............ 340/172.5; 235/151.11; 318/568

[56] References Cited
UNITED STATES PATENTS

| | | | |
|---|---|---|---|
| 2,867,759 | 1/1959 | Comstock | 235/151.11 X |
| 3,259,957 | 7/1966 | Stobbe | 235/151.11 X |
| 3,291,970 | 12/1966 | Evans et al. | 235/151.11 |
| 3,348,208 | 10/1967 | Rosener | 340/172.5 |
| 3,539,789 | 11/1970 | Fitzner | 235/151.11 |
| 3,613,608 | 10/1971 | Hinerfeld | 318/568 |
| 3,634,664 | 1/1972 | Valek | 235/151.11 |
| 3,686,639 | 8/1972 | Fletcher et al. | 340/172.5 |

Primary Examiner—Paul J. Henon
Assistant Examiner—Melvin B. Chapnick
Attorney, Agent, or Firm—Seed, Berry, Vernon & Baynham

[57] ABSTRACT

A numerical control system specifically designed for programming by the machine tool operator and a simplified programming method therefor which allows the control to be completely programmed by the operator without resort to complex data bearing media or codes. The operator begins by examining some description of the required machining operations such as a part drawing to determine the desired positioning operations and the sequence of positioning steps. The co-ordinates of each step in the positioning sequence are determined relative to some predetermined reference point or "zero position". The digital information relating to each such step is programmed into the control by placing that information into data switches on each of a plurality of program panels. The control system is then activated to sequence operation by transferring the contents of the first of these control panels into the control and then carrying out the positioning operation specified in that particular panel. After the desired position is reached, a machining operation takes place and the control system sequences to the next program panel and carries out the next step in the positioning sequence.

8 Claims, 6 Drawing Figures

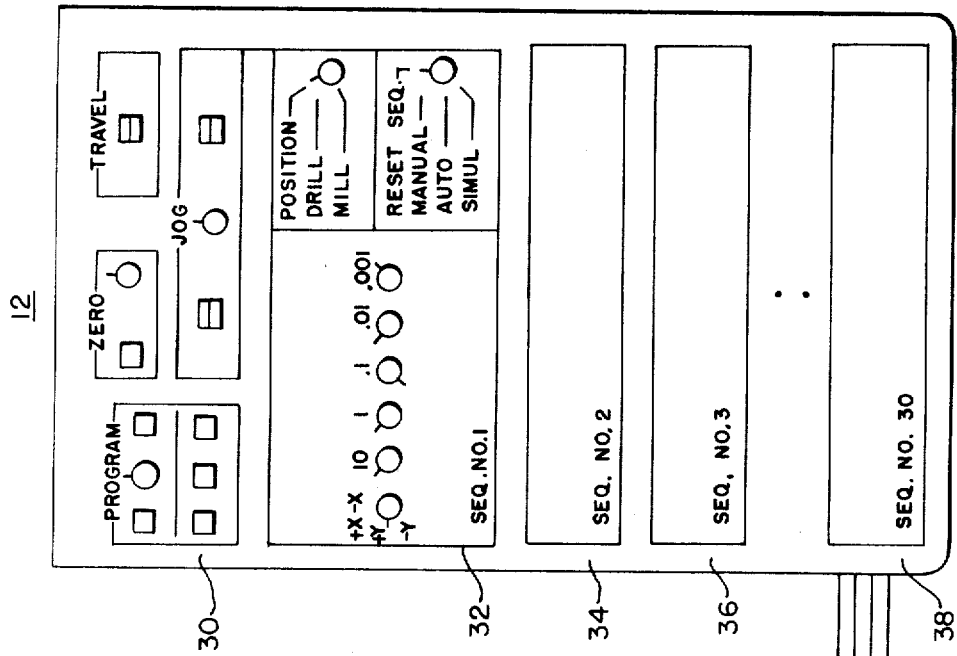
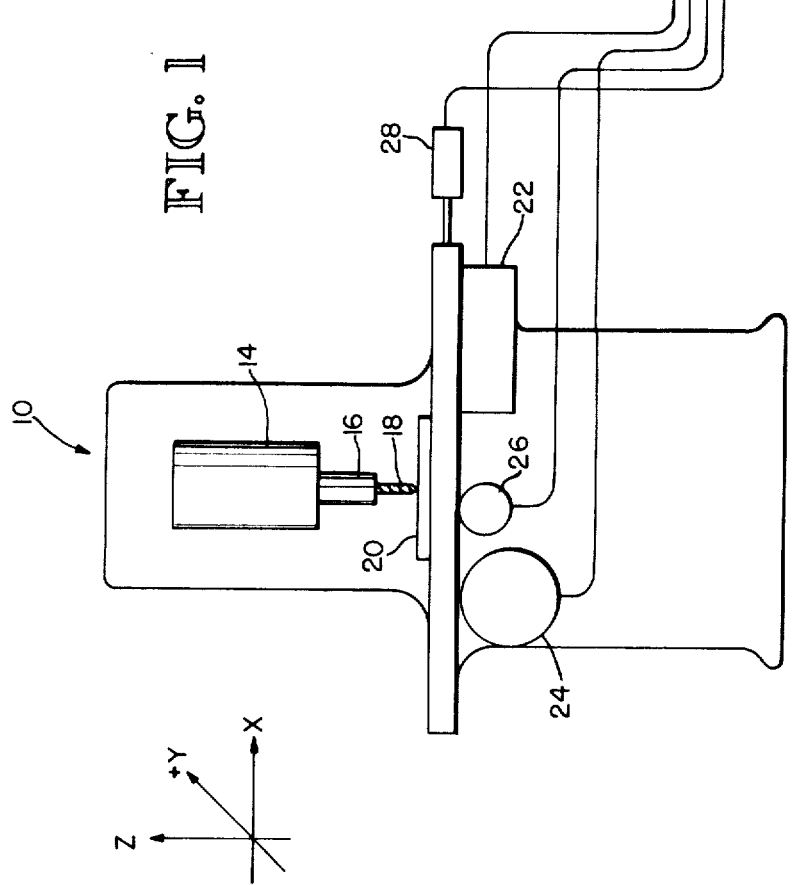
FIG. 1

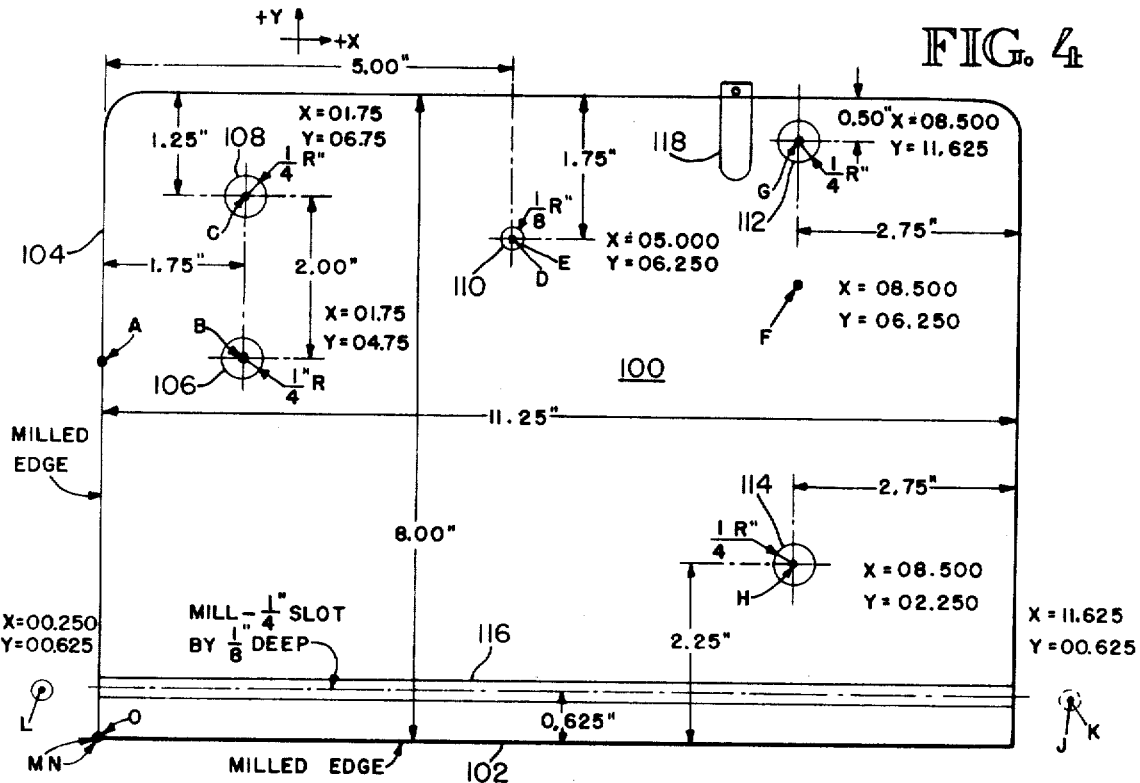

FIG. 4

| SEQ. NO. | POSITION | | TOOL MOTION | | | NEXT SEQUENCE | | | SPINDLE MODE |
|---|---|---|---|---|---|---|---|---|---|
| | SECTOR | DISTANCE (FROM ZERO) | POS. | DRILL | MILL | RESET | MAN-UAL | AUTO | SI-MULT. | INSTRUCTIONS |
| 1 | +Y | 04.750 | X | | | | | X | | |
| 2 | +X | 01.750 | | X | | | X | | | DRILL $\frac{1}{2}$" D. THRU |
| 3 | +Y | 06.750 | | X | | | X | | | DRILL $\frac{1}{2}$" D. THRU |
| 4 | +X | 05.000 | | | | | | | X | |
| 5 | +Y | 06.250 | | X | | | X | | | DRILL $\frac{1}{4}$" D. THRU |
| 6 | +X | 08.500 | | | | | | X | | |
| 7 | +Y | 07.500 | | | | | X | | | DRILL $\frac{1}{2}$" D. THRU |
| 8 | +Y | 02.250 | | | | | | | | |
| 9 | +X | 11.625 | | | | | | X | | DRILL $\frac{1}{2}$" D. THRU |
| 10 | +Y | 00.625 | | | | | X | | | $\frac{1}{4}$" END MILL |
| 11 | −X | 00.250 | | | | | X | | | RETRACT MILL |
| 12 | +X | 00.000 | | | | | | | X | |
| 13 | +Y | 00.000 | | | | X | | | | |

TOOLS: $\frac{1}{2}$" DRILL, $\frac{1}{4}$" DRILL, $\frac{1}{4}$" END MILL

FIG. 5

OPERATOR PROGRAMMED NUMERICAL CONTROL SYSTEM

BACKGROUND OF THE INVENTION

The present invention relates to electronic control systems. More specifically, the invention relates to a numerical control system for machine tools which is programmed by the machine operator from ordinary part drawings without requiring complex post-processors, prepared data bearing media, etc.

Electronic control systems for controlling the positioning and other functions of machine tools are well known in the art. Early versions of such numerical control systems utilized magnetic tapes which were prepared by making a first "dry run" at which time the tape was recorded to repeat the movements which took place during the "dry run." The machine was thereafter operated by the signals from this magnetic tape which simply carried out the operations previously programmed during the dry run.

The next step in the development of numerical control systems came with the advent of elaborate special purpose computers known as post-processors which prepared the same type of magnetic tapes automatically when given the necessary information regarding part co-ordinates, desired machining operations, etc. Such systems were, of course, of primary use in large machine shops such as those commonly found in the aerospace industry because of the expense and technological complexity of the post processor which prepared the tapes.

As development continued, many of the functions of the post processor were integrated into the control system itself. In such systems, the position data and other information necessary to define a machining operation were encoded on punched cards, punched paper tape, etc. The numerical control system would operate on these data to define the operation required by the controlled machine tool. One of the earliest control systems of this type can be found in U.S. Pat. No. 3,069,608 to Forrester et al.

In many respects, the prevalent state of the art today is essentially the same as that shown in the Forrester patent. The internal circuitry has, of course, changed substantially with the advent of solid state devices and integrated circuits so that improved operation and speed has been the natural result. In terms of control system philosophy, however, the essential approach remains the same — the part geometry, desired machining operations, tool selection, etc. are all coded on some type of data bearing media, principally punched tape or paper or mylar and paper construction. The punched tape or other data bearing media is then inserted into a reader in the control system which feeds the encoded data to the various segments of the system to carry out the desired control function.

Though such control systems have met with enthusiastic and substantial acceptance in the machine tool industry, they have a single, universal characteristic which relates to the method by which input data are fed to the system. That is, all require a data bearing media (e.g., punched tape) to describe the desired operation. Since the preparation of the tape is a function beyond the competence of the ordinary machine tool operator, there must be some source of tapes which describe the desired operation.

For complex contouring type control systems, a computer is generally required to generate the desired part tape. In many instances this limits the use of the control system to customers who have the skill and resources to be able to generate the tapes through post-processor routines tailored to their individual computer. Smaller organizations are able to utilize such systems only by relying upon the services of outside organizations which can prepare their tapes for them. This naturally means that the time and effort required to properly program a tape and produce satisfactory parts is increased as is the attendant cost. Even minor errors in the program result in confusion and ruined parts to say nothing of the time spent in analyzing the programming error, preparing a new tape, etc.

These same problems are present to a somewhat lesser degree with the simpler positioning control systems. Though the information required on the tapes is less complex, the need for special personnel and equipment to prepare them remains. While a computer is not always necessary to generate the tapes for a positioning control system, one must translate the dimensional information, etc. from part drawings to the language required by the control system. Moreover, special tape punches, etc. are required to physically prepare the tape itself. In short, this requires trained personnel in addition to the actual machine tool operator and results in an increase in time which is inconsistent in many instances with the orderly operation of small job-shop operations.

For these reasons, the use of numerical control has been somewhat limited in market scope. In order for an organization to utilize contemporary numerical control techniques it must have a certain degree of sophistication or rely heavily upon other organizations with the attendant time and expense. In order to expand the field of numerical control to fully utilize its many advantages, there is a demonstrated need for a relatively simple system which is capable of machinist programming while retaining the advantages of numerical control in terms of accuracy, speed, etc. It is the purpose of the present invention to provide such a system.

There have been some extremely limited use of numerical control systems which were capable of machinist operation. Such systems utilized what is referred to as manual data input to take the place of the punched tape or other data bearing media. The principle difficulty with such systems is that they have retained the requirement that the data be encoded to be compatible with a control system which is principally designed for data input from punched tape, etc. That is, the machine operator had to translate information from the part drawing into the necessary codes which were then set in thumbwheels or other switches for ultimate transfer into the control system.

A second and substantial disadvantage with this approach is that it requires the operator to "program" one operation and execute it and then "program" the next since only a single set, or at most an extremely limited set, of input switches is provided. For making a single part this approach is not particularly troublesome, but where a multiple part run is involved the operator has to go through this sequence for each part. This requirement not only slows down operation substantially but also multiplies the chance of error from part to part. It can be seen that the principle difficulty with this approach is that it utilizes a basic control concept that is designed primarily for a different type of data input, i.e., punched tape or whatever.

SUMMARY OF THE INVENTION

Briefly stated, the present invention overcomes the drawbacks of prior art systems by providing a control system which is specifically designed for programming by the machine tool operator from ordinary part drawings without resort to special encoding or machine language. The control system is provided with multiple sources of data so that a number of operations can be preset by the operator. At the completion of each positioning and machining step, the control system can automatically step to the next desired operation and thus carry out the operations in the sequence desired. The system has the flexibility to allow for either automatic or operator control of associated, non-positioning functions such as drilling, tapping, tool selection, etc. after the desired position is achieved under automatic control.

OBJECTS OF THE INVENTION

It is therefore an object of the present invention to provide an improved numerical control system which is capable of programming by a machine tool operator.

It is a further object of the present invention to provide such an improved numerical control system which can carry out desired machine tool functions without resort to special machine language or data bearing media.

It is a still further object of the present invention to provide such an improved numerical control system which is relatively inexpensive, maintenance free and susceptible to use by customers who are accustomed to using conventional machine tools and do not have the degree of sophistication which is presently required to utilize contemporary numerical control techniques.

It is a still further object of the present invention to provide a simplified programming method which allows for operator programming of the improved numerical control system of the present invention.

DESCRIPTION OF THE DRAWINGS

While the specification concludes with claims particulary pointing out and distinctly claiming the subject matter which is regarded as the invention, as illustration of a particular embodiment can be seen by referring to the specification in connection with the accompanying drawings in which:

FIG. 1 is a representation of a typical machine tool 10 which is connected to a numerical control system 12;

FIG. 4 is a part diagram for an exemplary part used to describe the operation of the numerical control system of the present invention;

FIG. 5 is a programming chart illustrating the programming of the numerical control system of the present invention in order to perform the operations needed to machine the part shown in FIG. 4.

DESCRIPTION OF THE PREFERRED EMBODIMENT

Figure 3:
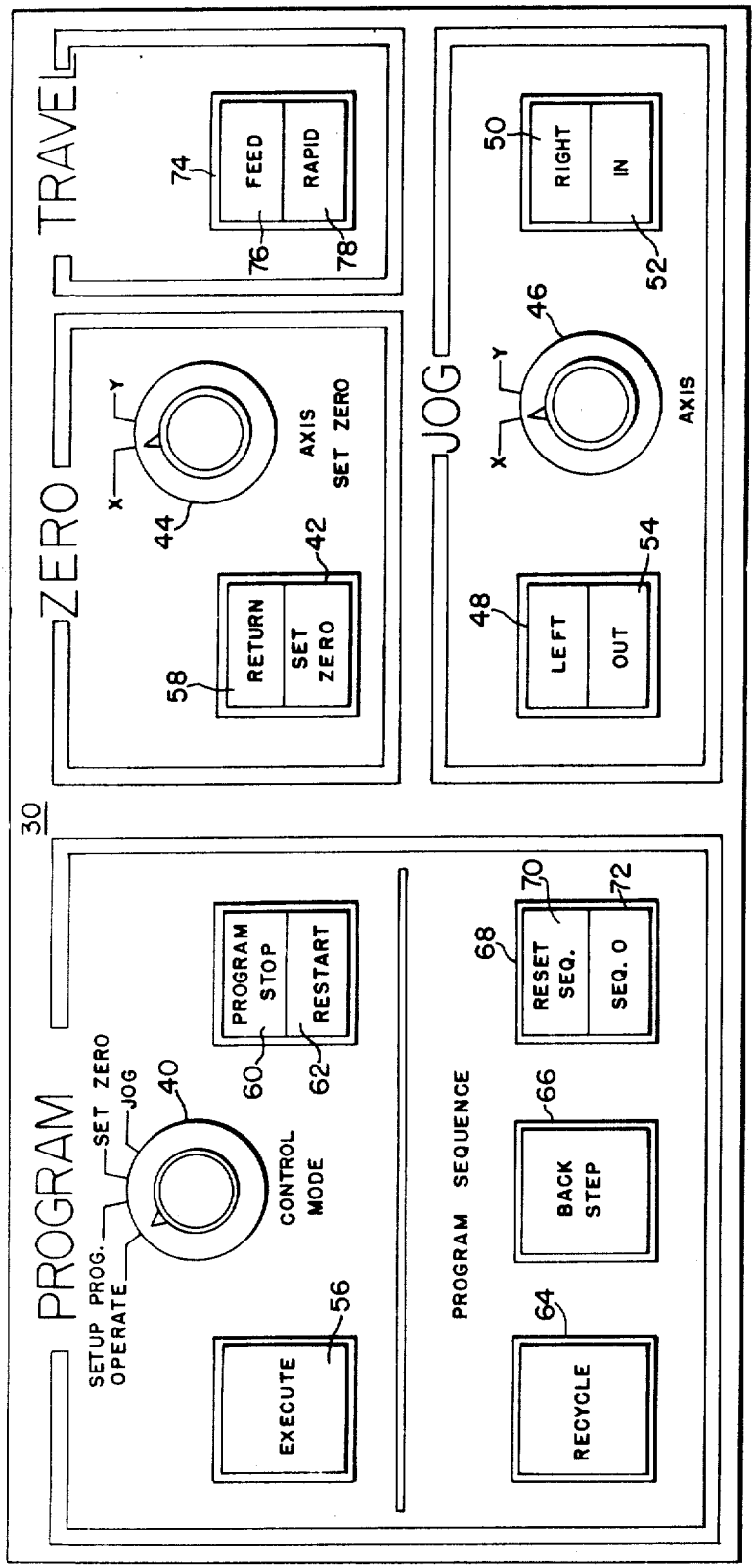
FIG. 3 is a representation of one of the program panels of the improved numerical control system of the present invention.

FIG. 1 is a representation of a conventional machine tool 10 which is connected to operate under the control of a numerical control system 12. For the purposes of the present explanation, the machine tool 10 can be viewed as a conventional drill press with the understanding that the numerical control system of the present invention can control the operation of a variety of different types of machine tools and is not limited in application to controlling the operation of a drill press.

The machine tool 10 has a quill 14 which includes a rotating spindle 16 having some type of cutting tool 18 therein. For simplicity, it will be assumed that the quill 14 is manually operated by the machine tool operator with the understanding that the numerical control system of the present invention is also designed to operate in conjunction with an automatic control system for the quill whether it be of the conventional third axis type or a special control system for the quill.

Mounted on the bed of the machine tool 10 is a workpiece 20. The position of the workpiece 20 is controlled by the numerical control system 12 which energizes the drive systems 22, 24 for the "X" and "Y" axes, respectively. The particular type of drive system will vary from one machine tool to another and the numerical control system of the present invention is equally capable of utilizing clutch drive systems, hydraulic cylinders, hydraulic motors, or electric motors of various types including AC, DC and stepping motors.

The position of the movable axes of the machine tool 10 is relayed to the control system 12 by some type of position transducers 26, 28 which are mechanically coupled to the X and Y axes, respectively. If the machine tool is driven by a lead screw, the transducers 26, 28 may be mechanically coupled to the drive motor or lead screw. In the alternative, the position transducers may be mechanically coupled to their respective movable axes in some other fashion such as precision rack and pinion arrangements commonly used for instrumentation of this type.

The numerical control system 12 contains two major types of elements for establishing the desired program by the machine operator. The first portion is shown on the upper half of the control system and will be referred to hereinafter as the master control panel 30. A detailed showing and explanation of the master control panel 30 will follow with reference to FIG. 2.

The other element of the control system 12 is a plurality of program panels 32, 34, 36, 38, one of which is shown in detail in FIG. 3. While a detailed explanation follows, it suffices for the present to say that each of the program panels 32, 34, 36, 38 is used by the machine operator to record a particular positioning sequence required to carry out a desired machining operation.

Figure 2:
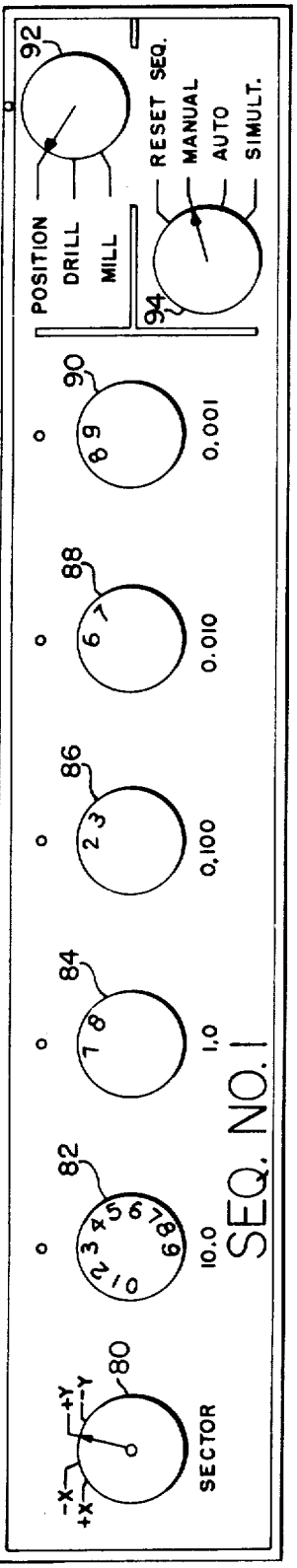
FIG. 2 is a representation of the master control panel of the numerical control system described herein as the preferred embodiment of the present invention.

Turning now to FIG. 2, there is shown a representation of the master control panel 30 illustrating the various functions of the present numerical control system. Each of the elements on the master control panel 30 will be explained in detail as to their function and an example will follow with regard to an exemplary machine operation to manufacture the part shown in FIG. 4.

The first major portion of the master control panel 30 is the PROGRAM portion. It includes the CONTROL MODE selector 40 which is used to determine the particular type of operation to be carried out. Thus, in the JOG position, the control system is capable of manually jogging the controlled machine tool under the control of the JOG portion of the master control panel 30.

When the control mode selector 40 is in the SET ZERO position, the control system is operative to establish the zero position of the controlled machine axes by appropriate positioning of the machine tool and operation of the ZERO portion of the master control panel 30. As will be seen in some detail hereinafter, the numerical control system of the present invention is equipped with what is conventionally known as "full floating zero" capabilities. That is, the control system is capable of establishing the "zero" position for both controlled axes at any desired location on the controlled machine tool 10.

When the control mode selector 40 is placed in the SETUP PROG. position, the control system is essentially disabled to allow the operator to program the system without machine operation.

Finally, the control mode selector 40 may be placed in the OPERATE position in which case the system is prepared to carry out the desired sequence of positioning operations as previously established by the machine tool operator.

It should be noted that the control mode selector 40 is equipped to protect against accidental operations by deactivating certain other portions of the master control panel 30 depending upon the setting of the control mode selector 40. That is, if the control mode selector 40 is set in the OPERATE position, the SET ZERO pushbutton as well as the JOG pushbuttons will be inactivated. To further assist the machine operator, the various pushbuttons on the master control panel 30 are all illuminated pushbuttons. When a particular pushbutton is active it will be illuminated so that the machine operator can tell at a glance the types of functions he can perform at any given time.

The ZERO section of the master control panel 30 is used to establish the "zero position" of the controlled machine axes in accordance with the particular machine operation to be performed. As pointed out hereinbefore, the present numerical control system has "full floating zero" capabilities and is thus capable of varying the zero positions of the controlled axes to correspond to particularly appropriate locations on the actual workpiece. That is, a workpiece with an existing hole may be best machined by setting zero at the center of the hole. Or a workpiece with two intersecting milled edges might conveniently be machined by establishing zero at the intersection of the two milled edges.

When the control mode selector 40 is placed in the SET ZERO position, the ZERO section of the master control panel 30 is activated for establishing the zero positions of one or both controlled machine axes. The SET ZERO pushbutton 42 will be illuminated. Activating this pushbutton will establish the present location of the machine as the "zero position" for the particular axis selected by the AXIS SET ZERO selector 44. Thus, if the operator desires to establish one milled edge of a part as the zero for X axis, he need only jog the machine (usually with an indicator of some type in the spindle) to that edge, turn the control mode selector 40 to the SET ZERO position, set the AXIS SET ZERO selector 44 on X and depress the SET ZERO pushbutton 42. This establishes the zero position for X axis. The zero position for Y axis can be similarly established by following these same steps and setting the AXIS SET ZERO selector 44 in the Y position prior to depressing the SET ZERO pushbutton 42.

The JOG section of the master control panel 30 is activated by placing the control mode selector 40 in the JOG position. The machine operator can then move the two axes of the controlled machine to any desired position. The desired axis is first selected by the position of the AXIS selector switch 46. Placing the AXIS selector 46 in the X position allows the operator to move the machine in that axis by depressing the desired LEFT pushbutton 48 or RIGHT pushbutton 50. Similarly, placing the AXIS selector 46 in the Y position allows the operator to move the machine in that axis by depressing the IN pushbutton 52 or the OUT pushbutton 54.

In addition to performing various manual functions such as tool changes, etc. the JOG portion of the master control panel 30 is particularly useful in conjunction with the ZERO section to establish the desired zero position of the machine tool prior to programming for performance of the desired machining operation.

In order to operate the control system to perform a programmed machining operation, the control mode selector 40 is placed in the OPERATE position. The EXECUTE pushbutton 56 is activated and illuminated and when depressed will initiate the performance of the program sequences and indicate their completion. In addition, the RETURN pushbutton 58 is activated and illuminated. Depressing the RETURN pushbutton 58 will result in returning the controlled machine tool 10 to the pre-established zero position and return the program sequence to "Sequence 0."

During actual operation, the machine operator may wish to interrupt operation and place the control and machine in a hold condition in order to check a tool, turn on coolant, etc. This is done by depressing the PROGRAM STOP pushbutton 60. Control operation will cease and the machine tool will remain in its present position. When it is desired to resume operation, the operator simply depresses the RESTART pushbutton 62 and operation resumes as before.

As was pointed out hereinbefore, the numerical control system of the present invention utilizes data which is operator programmed by setting the position of the various switches on the program panels 32, 34, 36, 38. The master control panel 30 is then activated to step the controlled machine tool 10 through the sequence of positioning operations as defined in the program panels 32, 34, 36, 38. During actual operation, however, it may be desirable to alter the previously determined sequence of positioning operations. This is done by the series of pushbuttons in the PROGRAM SEQUENCE portion of the master control panel 30.

The RECYCLE pushbutton 64 causes the control system to re-read the information from a program sequence at which the system has presently stopped or is presently executing. In the exemplary control system shown hereinafter, the information for a particular program sequence is read into the system when the control steps to that sequence but prior to the actual execution of the commanded position. In order to alter this information, new information may be selected by modifying the settings of the various switches on the affected program panel and then reading that information into the system by depressing the RECYCLE pushbutton 64.

The BACK STEP pushbutton 66 will cause the control system to step back one step in the predetermined sequence of positioning operations. The sequence can be "backstepped" as far as desired by repeated operation of the BACK STEP pushbutton 66 since the information contained in the sequences passed through will not be read into the control system until operation is resumed by operation of either the EXECUTE pushbutton 56 or the RECYCLE pushbutton 64 depending upon how the previous sequence was interrupted. In the exemplary control system described hereinafter, it is necessary to back step one sequence before the first sequence actually desired prior to resuming operation. After completing the desired back step, the ensuing sequences can either be modified to change the program or remain the same so as to repeat certain steps of the program without change.

The RESET SEQUENCE pushbutton 68 is actually a single pushbutton with two separate illuminated sections 70, 72. Depressing this pushbutton will return the control system to Sequence 0 and cause the SEQUENCE 0 section 72 to be illuminated. This section will also be illuminated during other circumstances such as operation of the RETURN pushbutton 58 or initial energization of the system when the control sequence is at zero. Unlike the RETURN pushbutton 58, operation of the RESET SEQUENCE pushbutton 68 does not cause the control system to return the controlled machine tool to the zero position. Instead, it simply returns the program to the Sequence 0 position.

The final section of the master control panel 30 is the TRAVEL section. This includes a single pushbutton 74 with two illuminated sections 76, 78. When the RAPID section 78 is illuminated, the control system is operating to cause the controlled machine tool 10 to move at some relatively high rapid traverse rate such as 250 inches per minute. In order to reduce this to a lower "feed" rate, the pushbutton 74 is depressed and the machine will then position at some predetermined feed rate which can be fixed or variable anywhere from zero to 50 inches per minute. When the control is causing the machine to operate at the feed rate, the FEED section 76 of pushbutton 74 will be illuminated.

Turning now to FIG. 3, there is shown a detailed diagram of one of the program panels 32, 34, 36, 38 shown briefly in FIG. 1. The purpose of the program panel 32 is to allow the machine tool operator to designate the desired position of the controlled machine tool 10 to be performed during this particular sequence of the machining operation. Program panel 32 bears the designation SEQUENCE indicating that it contains the information desired in the first sequence of the machining program. In a numerical control system of the type described hereinafter there will be a large number of program panels of this type and the actual number will depend on a number of factors including the type of machine being controlled, the relative complexity of the various machining operations to be performed, etc. For relatively simple drilling machines, it appears that about thirty program panels of this type may be optimum when one considers the type of operations to be performed and the increase in cost which necessarily accompanies an increase in the total number of program panels. Each such panel will bear a sequence number identification indicating where it falls in the predetermined sequence of machining operations.

The first selector switch on the program panel 32 is the SECTOR switch 80. This particular switch is used to designate the sign (plus or minus) and axis (X or Y) to correspond to the numerical data indicative of the desired position. If the first positioning operation is to call for the machine to go to some position in the positive Y axis, the SECTOR switch 80 will be positioned as illustrated in FIG. 3. A positive X axis position is achieved by setting the SECTOR switch 80 in the +X position and so forth.

After determining the desired sector, the machine operator must then designate the numerical value of the desired position. This is accomplished by appropriately setting the position of selector switches 82, 84, 86, 88, 90. For the sake of simplicity, it will be assumed that the control system is designed for plus and minus programming and that position data are in absolute values from a predetermined zero position with the understanding that the basic concepts of the present invention apply equally to a control system which uses only positive value programming (and indicates negatives, if permissible, by some system such as the so-called nines complement) and/or incremental data for defining the desired position of the machine tool.

In the exemplary control system shown herein, data resolution is limited to a minimum value of 0.001 inch and the maximum position that can be programmed is 99.999 inches. For the vast majority of machine tools this particular resolution and upper limit on position is more than adequate. It is, of course, recognized that certain precision types of machines such as jig bores, etc. may require greater degrees of data resolution down to tenths or even hundredths or thousandths of an inch. Similarly, there are certain types of large machines such as punch presses for structural steel, etc. which may require the capability of positioning to distances in excess of 99.999 inches with or without retaining the 0.001 inch data resolution. It will be apparent that one can alter either or both of these factors, i.e. data resolution or positioning distance, by either adding additional digits or changing scale on the existing digits; and the use of 0.001 inch and 99.999 inches in the present system is to be considered exemplary only.

In order to establish the desired position in Sequence 1, the machine operator adjusts the position of selector switches 82, 84, 86, 88, 90 to reflect the numerical value of the desired position. Thus, if Sequence 1 was to call for a position of 37.269 inches in the positive Y direction, these selector switches would be set as illustrated in FIG. 3. That is, the 10's digit selector switch 82 is set on 3, the 1's digit selector switch 84 set on 7 and so forth. In this way, the operator establishes the desired value of the position of the controlled machine tool in each step of the program sequence.

After establishing the desired sector and numerical position, the machine tool operator will indicate the type of positioning action desired during this particular sequence. This is done with a three-position selector switch 92. If the motion in a particular sequence is a simple positioning motion, the selector switch 92 will be set to POSITION. This indicates to the numerical control system that the positioning step described in this particular sequence is to be carried out at some relatively high rate such as 250 inches per minute.

If the positioning step in a particular sequence is to conclude with a drilling operation, the selector switch 92 will be set in the DRILL position. This commands the numerical control system to carry out this particular positioning step at rapid speed.

Finally, if the programmed sequence is a milling operation, the selector switch 92 will be set in the MILL position. This causes the numerical control system to carry out the positioning step at a substantially reduced rate consistent with a milling operation. The actual mill rate may be preset in the control system or the selector switch 92 may be combined with a variable potentiometer (not shown) which can be adjusted by the machine operator to achieve the desired rate for each milling operation in the cycle. Further, as will be seen hereinafter, the operation of the selector switch 92 is coordinated with the operation of a four position selector switch 94 so as to fully define the type of positioning operation desired.

The final setting in each sequence of operation is made by establishing the position of the four position selector switch 94. The precise operation of the system for the various settings of the selector switch 94 will depend in part upon whether the controlled machine tool is equipped with a control system for controlling the operation of the quill. That is, the controlled machine may automatically carry out the desired drilling, etc. operations under the control of an automatic quill control system or the machine may be fully manual in this area and require the machine operator to perform the actual drilling operations after the machine tool has been positioned by the numerical control system. For the purposes of the present explanation, it will be assumed that all machining operations are carried out under the manual control of the machine operator (i.e. without automatic quill control) with the understanding that certain modifications result when the machine tool includes an automatic quill positioning system of the type referred to hereinbefore.

When the control sequence calls for some type of machining operation at the end of the positioning cycle, selector switch 94 will be set as illustrated in the MANUAL position. The control system will position the controlled machine tool to the desired position and then hold that position until signalled by the operator to proceed to the next sequence. Thus, if the operator determines that a hole is to be drilled in the workpiece at a particular location he will establish the numerical value of that location at the desired sequence and set selector switch 94 in the manual position. After the desired position is reached he will proceed to drill the desired hole and then activate some type of pushbutton, etc. to signal the control system to proceed to the next step in the program sequence.

Certain situations will call for the controlled machine to move to some desired position and then proceed directly to the next step in the sequence without any delay or machining operation. Examples of this type of operation will be discussed in detail with reference to FIGS. 4 and 5. Under this type of operation, the machine operator will set selector switch 94 in the AUTO position. As soon as the controlled machine has been positioned as indicated in that sequence, the control system will immediately proceed to the next step in the sequence and carry out the programmed operation.

As can be seen from quick reference to FIG. 3, the program panels of the present invention are limited to commanding the position of the controlled machine tool in one axis at a time. As will be apparent, it is frequently desirable to move both axes simultaneously so as to arrive at the desired position for the next machining operation as quickly as possible. Thus, Sequence No. 1 may indicate the X axis position for the next machining operation and Sequence No. 2 may indicate the desired position in Y axis for this operation. To carry out both steps of the sequence simultaneously (and thus position both axes at the same time) the operator sets selector switch 94 in the SIMULT. position. The control system will then carry out both steps at the same time. At the end of the operation, the control system will proceed according to the setting of selector switch 94 in sequence No. 2.

Finally, selector switch 94 is used to indicate the final step in a programmed sequence and return the control system to the beginning of the program preparatory to the machining of another part. The end of the programmed sequence is indicated by setting the selector switch 94 in the RESET SEQ. position. The last step in the sequence may also include position data which will move the controlled machine to some desired position (such as zero) so as to be ready to commence the program anew on a fresh part.

The actual programming of a program sequence for a desired part will be illustrated with reference to FIGS. 4 and 5. FIG. 4 is a somewhat embellished representation of a blueprint for a plate which is to be drilled and milled as shown. The plate 100 is previously cast and/or machined and has two milled edges 102, 104. The controlled machine tool is to carry out the machining operations shown by drilling the holes 106, 108, 110, 112, 114 and milling the slot 116. The part will be held in place on the bed of the machine tool by clamps and/or a fixture of some type with one of the clamps 118 illustrated in FIG. 4.

In almost all cases, the machine operator will be able to work directly from the part drawing without the need for additional programming sheets. Note however that in other situations it may be preferable for the machine operator to have a programming sheet such as shown in FIG. 5. He, or someone else in the shop, can transfer the desired information from the part drawing of FIG. 4 to the program sheet prior to establishing the settings on the control system. The need for such a program sheet will of course depend upon the complexity of the part as well as the skill of the operator. For ease of illustration, the program sequence for machining the part shown in FIG. 4 has been transferred to the program sheet of FIG. 5 with the understanding that this step may not be necessary in every case.

The first time a part of this type is machined, it will be necessary for the operator to establish the desired zero position using the various control devices as illustrated and explained with reference to the master control panel of FIG. 2. Since the part 100 in FIG. 4 has the two milled edges 102, 104 the operator can readily establish zero at the intersection of these two edges, i.e. the lower left hand corner. The actual steps for establishing zero have been described hereinbefore and will not be repeated at this point.

After having established the desired zero position, the operator will then commence to make the appropriate settings in the program panels 32, 34, 36, 38 to conform to the dimensions of the part and the desired type of machining operations. To carry out the operations for the part of FIG. 4, the operator might begin by deciding first to position the controlled machine tool so as to drill hole 106. Since the center of hole 106 is located 4.75 inches above the lower left corner, Sequence No. 1 would be used to establish that position by selecting +Y on the SECTOR switch 80 for the program panel and setting the digital switches to 04750. Since no machining operation takes place at this point, the three position selector 92 would be set to POSITION and the four position selector 94 to AUTO. When the program is executed, the machine will move up to the position shown at A in FIG. 4 and then move directly to execute Sequence No. 2 since the four position selector 94 is set to AUTO. These settings are all set forth under SEQ NO. 1 in the sample programming sheet of FIG. 5.

The next step (Sequence No. 2) will require moving the controlled machine to the desired position in X axis. This is accomplished by setting the SECTOR switch 80 in the SEQ. NO. 2 program panel 32 to +X and setting the digital switches 82, 84, 86, 88, 90 to 01750 (corresponding to 1.75 inches in the plus X direction from the predetermined zero). Since a drilling operation takes place at this point, the three position selector 92 is set at DRILL and the four position selector 94 at MANUAL. When this program sequence is executed, the control system will position the controlled machine to the position shown at B6 (i.e. the center of hole 106) and stop. The operator will then drill the desired hole and indicate to the machine (i.e. by depressing a button) that the program sequence is to continue.

Since hole 108 is directly above hole 106, the movement of the machine to drill that hole can be accomplished by a single step in the program sequence. That is, the SECTOR switch 80 in the SEQ. NO. 3 program panel is set at +Y and the digital switches at 06750 to correspond to the desired new position in Y axis (i.e. 6.75 inches above the zero point). Since the information in X axis does not change, the operator need not program any information for that axis because the control system of the present invention is designated to retain previous information for the controlled axes until the information for that axis is changed. As with SEQ. NO. 2, the three position selector will be set at DRILL and the four position selector 94 at MANUAL so to position the machine at the maximum speed and halt operation until the operator carries out the desired machining operation and commands the control system to continue with the program sequence.

Since the next desired position is the center line of hole 110 it will be necessary to describe this particular position using two steps in the program sequence. The operator may decide, however, to carry out both steps simultaneously rather than sequentially as was done in the case of the move from the zero position to hole 106 in Sequence Nos. 1 and 2. Thus SEQ. No. 4 may describe the new position in X axis by setting the SECTOR switch 80 at +X and the digital switches at 05000 to correspond to 5.00 inches in the positive X direction. To describe the new Y axis position, the sector switch for SEQ. NO. 5 is set at +Y and the digital switches at 06250. In order to execute both of these steps in the sequence at the same time, the four position selector 94 in SEQ. NO. 4 is set at SIMUL. This commands the control system to carry out that step and the next succeeding step at the same time by changing the position data for both axes to conform to the data in those two steps.

To complete the settings for these two steps, the operator will set the three position selectors for both steps at DRILL and set the four position selector 94 in SEQ. NO. 5 at MANUAL to signal the control system to stop after that step in the sequence to allow the operator to perform the desired drilling operation.

The next step in the machining sequence will be the drilling of hole 112. Since this hole also requires a change in the data for both X and Y axes, it might be suggested that the same procedure used for hole 110 be followed, i.e. the simultaneous motion of both X and Y axes. The difficulty, however, with this approach for hole 112 is that clamp 118 is physically located in the direct path between hole 110 and hole 112. The cutting tool may not have sufficient clearance and a simultaneous move from hole 110 to hole 112 might result in the tool striking the clamp 118 before it arrives at the final position to drill hole 112. For this reason, the operator will probably decide to make the move to drill hole 112 by two separate sequential steps.

The first of these steps would be programmed in SEQ. NO. 6 so as to move the machine to the position indicated at F in FIG. 4. This position does not change the Y axis data but only requires a change in the X axis data. This is accomplished, therefore, by setting SECTOR switch 80 in Sequence No. 6 at +X and the digital switches at 08500 to correspond to 8.50 inches in the positive X direction. Since no machining operation takes place at this point, the three position selector 92 would be set to POSITION and the four position selector 94 to AUTO. When the program is executed in Sequence No. 6, the machine will move to the position indicated at F and then move directly to execute Sequence No. 7 because the four position selector 94 is set in the AUTO. position.

To complete the positioning for hole 112, the next step in the program sequence (Sequence No. 7) will be programmed to reflect the final position of hole 112. Since a move from Sequence No. 6 to Sequence No. 7 requires only change in the Y axis data, Sequence No. 7 will be programmed by setting the SECTOR switch 80 at +Y and the digital switches at 11625 to correspond to the desired new position in Y axis (i.e. 11.625 inches above the zero). Since the drilling operation is to take place at this point, the three position selector 92 is set at DRILL and the four position selector 94 at MANUAL. When this program sequence is executed the control system will position the controlled machine to the position for drilling hole 112 and stop. The operator will then drill the desired hole and indicate to the machine (i.e. by depressing a button) that the program sequence is to continue.

The next step in the program (Sequence No. 8) requires the positioning of the controlled machine tool so as to drill hole 114. Since this hole is positioned such that only a change in the data for Y axis is necessary, a single sequence can accomplish the desired positioning operation.

Thus, Sequence No. 8 requires setting SECTOR switch 80 in the +Y position and setting the digital switches at 02250 to indicate a position of 2.25 inches in the +Y direction. Since a drilling operation is to take place at this point, the three position selector 92 is set at DRILL and the four position selector 94 at MANUAL.

The final machining operation on part 100 is the milling of slot 116. For simplicity, slot 116 is shown as running the entire length of the part so as to eliminate intermediate machining operations.

In order to mill slot 116, it will be necessary to initially position the controlled machine so that the milling cutter will begin at some point off the edge of part 100. Thus, a position of X equals 11.625 inches and Y equals 00.625 inch will place the milling cutter in the position shown at J and K on FIG. 4. The actual programming for accomplishing this move will coincide with that used in Sequence Nos. 4 and 5 except for the difference in the dimensional data.

After having executed Sequence Nos. 9 and 10, the machine operator will place an appropriately selected milling cutter in the machine spindle so as to mill slot 116. The actual control of the milling itself is accomplished by the control system and Sequence No. 11 will be programmed to reflect the end point of the desired milling operation. The positioning operation to accomplish this desired milling operation requires changing the X position from 11.625 inches in the positive X direction to 0.250 inch in the negative X direction since the termination of the milling cut must necessarily be at some point to the left of milled edge 104.

The actual programming of Sequence No. 11 to accomplish the desired milling operation begins by setting the SECTOR switch 80 in the −X position. The digital switches are then set at 00250 to reflect the desired final position at the completion of the milling cut. The three position selector 92 will be set at MILL. As will be recalled from the foregoing description, setting this selector at MILL allows the operator to closely control the speed of the controlled machine tool as the milling cut takes place. This may be accomplished, for example, by way of a concentric potentiometer which is associated with three position selector 92 or otherwise located for the convenience of the machine operator. Finally, the four position selector 94 will be set at MANUAL.

Thus, when Sequence No. 11 is executed the milling cutter will move at the desired milling speed along the path indicated from the positions shown at J and K to the final position shown at L in FIG. 4.

The foregoing description is admittedly a simplified showing of how one might program and machine a sample part. Many parts will require substantially greater numbers of machining operations and different types of positioning cycles. Nonetheless, the foregoing is an ample description of the capabilities of the numerical control system and programming method of the present invention.

Following the completion of the milling cut, the part 100 is completely machined and it may be desirable to return the controlled machine tool to the "zero position" preparatory to the machining of another part. This is accomplished by the simultaneous move programmed in Sequence Nos. 12 and 13 on the programming sheet of FIG. 5. The only difference between this particular simultaneous positioning cycle and the preceding simultaneous positioning cycles is that four position selector 94 is set in the RESET SEQ. position so as to return the sequence counter to zero preparatory to reinitiating the program after a new, unmachined part is mounted on the controlled machine tool.

Briefly, the foregoing method of operator programming can be summarized as follows: The machine tool operator examines a part drawing or programming sheet to determine the coordinates of each operation in the machining sequence. This may initially require establishing some reference point on or near the part and establishing that point as the "zero position."

After determining the co-ordinates of each step in the positioning sequence, the operator programs these data in each of the program panels in the desired positioning sequence, indicating the numerical position of each step and the type of operation desired when the control system reaches that position. After all steps are thus programmed, the control system is activated to sequentially carry out each of the desired positioning steps.

Figure 6:
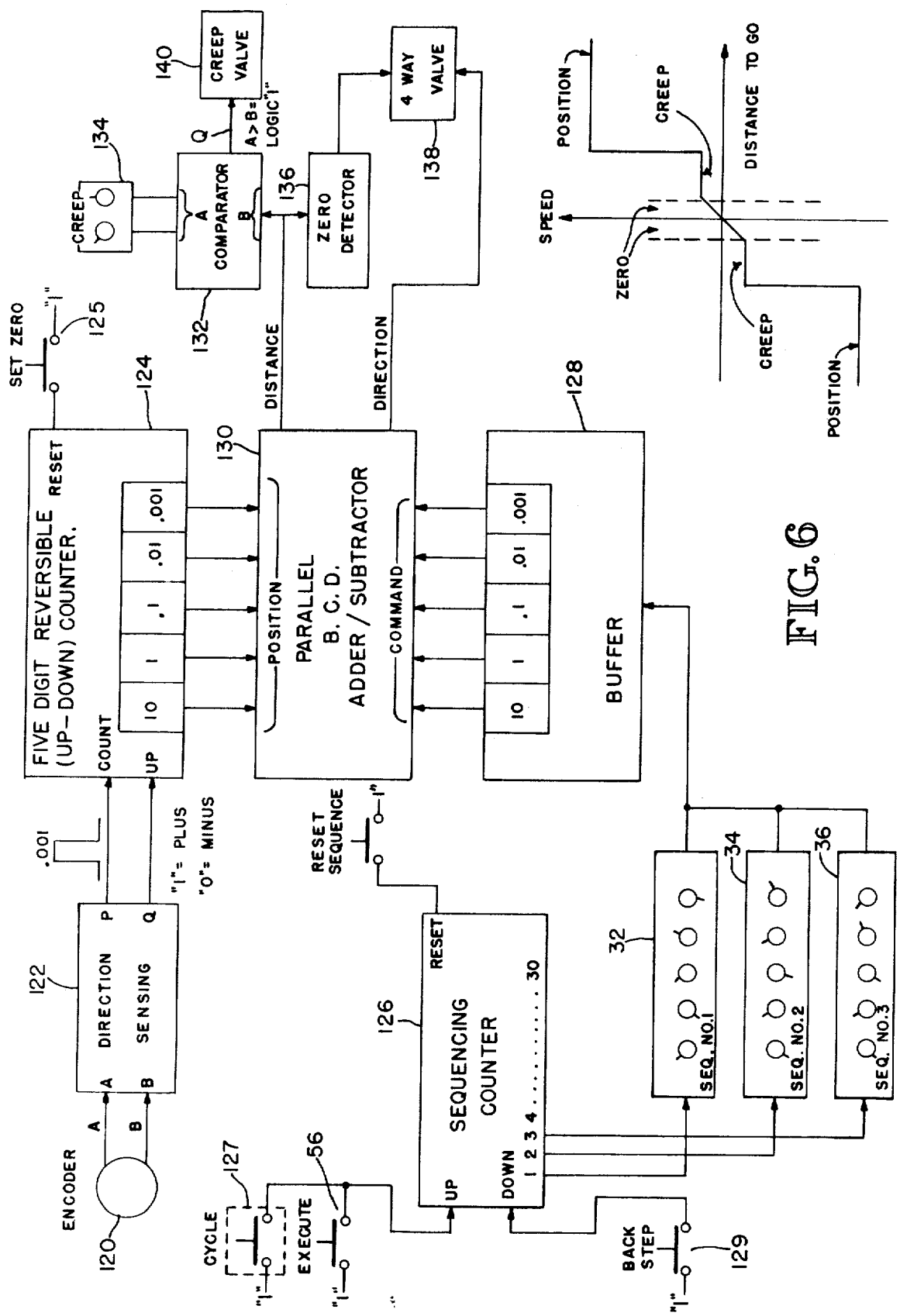
FIG. 6 is a detailed block diagram of a numerical control system which is the preferred embodiment of the present invention.

Turning now to FIG. 6 there is shown a somewhat simplified block diagram of the numerical control system of the present invention. As is true with the vast majority of modern numerical control systems, the numerical control system of the present invention operates by comparing a signal indicative of the present position of the machine tool with some type of command information which can be in any of several forms.

The block diagram of FIG. 6 illustrates the numerical control system of the present invention for one axis only with the understanding that portions thereof will be duplicated for each additional controlled machine axis.

The position of the numerically controlled machine tool is relayed to the control system by some type of encoder 120. The encoder 120 of FIG. 6 corresponds to the feedback devices 26, 28 of FIG. 1. For the purposes of the present invention, the position indicating means illustrated is exemplary only since any type of feedback device including, but not limited to, interferometers, selsyns, or any of the various types of electrical and electromechanical feedback devices may be used.

For the purposes of the present invention, the output of the encoder need only be reduced to two separate signals. These two signals will indicate to the numerical control system each time the controlled machine travels a predetermined distance, say 0.001 inch and the direction of travel. In the block diagram of FIG. 6, there is shown a direction sensing circuit 122 which converts the output of the encoder 120 into the two desired signals as described above.

For the purposes of the present explanation, it will suffice to say that the two input signals at input terminals A and B of the direction sensing circuit 122 are phase varying signals which are in some way indicative of the distance and direction of machine tool travel. The output signal at output terminal P will be a pulse of some reasonably limited duration each time the controlled axis travels 0.001 inch. The signal at output terminal Q will be a logic signal indicative of the direction of travel. That is, the signal present at output terminal Q will be a logic "one" when the controlled axis is traveling in the positive direction and a logic "zero" when the controlled axis is traveling in a negative direction.

The output of the direction sensing circuit 122 is connected to a five digit reversible counter 124. The function of the five digit reversible counter 124 is to accumulate the pulses from the direction sensing circuit 122 and appropriately indicate the present, absolute position of the controlled machine axis. Thus, the pulse signal from output terminal P of the direction sensing circuit 122 is connected to the COUNT input terminal of the five digit reversible counter 124 so that this counter will accumulate those pulses and retain a numerical indication of the present position of the controlled machine tool axis.

The signal from output terminal Q of the direction sensing circuit 122 is connected to the UP input terminal of the five digit reversible counter 124. With these connections, the five digit reversible counter 124 will count in the positive direction each time there is a pulse on the COUNT input terminal if the signal on the UP input terminal is a logic "one." If, on the other hand, the signal at the UP input terminal is a logic "zero" the five digit reversible counter 124 will count down one count each time there is a pulse on the COUNT input terminal. In this way, the five digit reversible counter 124 maintains an absolute indication of the present position of the controlled machine tool. Thus, the digital information contained in the five digit reversible counter 124 is, at all times, indicative of the position of the controlled machine tool and it is the contents of this counter that acts as the "feedback" information for the numerical control system.

The numerical control system of the present invention has "full floating zero" capabilities since the number stored in counter 124 can be set at zero at any desired physical position of the machine tool axis being controlled. This is accomplished by the SET ZERO pushbutton 125 which is connected to the RESET input terminal of counter 124. After locating the desired zero position as described hereinbefore, the machine tool operator depresses the SET ZERO pushbutton 125, resetting counter 124 to zero and thus establishing the desired zero position.

As will be recalled from the foregoing description of the numerical control system of the present invention, the command data are supplied from a plurality of program panels as shown in FIG. 3. The program panels, are sequentially activated to indicate the desired position of the controlled machine tool in any particular step of the program sequence. A brief, but nonetheless accurate, description of the basic operation of the numerical control system of the present invention is that the information from the program panels is sequentially transferred to the control system as dictated by a sequencing counter 126.

The sequencing counter 126 initiates the transfer of positioning information from the program panels 32, 34, 36 to the control system in the proper sequence and at the proper time to carry out the desired machining operations in the appropriate sequence of operational steps. Sequencing counter 126 is a reversible counter of sufficient capacity to sequentially activate the required numer of program panels of the numerical control system. The Sequencing Counter is a conventional UP-Down counter with individual counter outputs each connected to supply an activating pulse to one program panel as shown in FIG. 6. Each program panel may constitute any known system for manually presetting a numerical value which is fed into a counter upon the reception by the panel of a strobe or activating pulse. Such systems are widely used to preset tare into counters in electronic weighing units (U.S. Pat. No. 3,665,169) or to preset other values into a counter system (U.S. Pat. No. 3,604,903).

When operation begins, the sequencing counter 126 is at zero and no position data has yet been transferred to the control system. Operation commences by initiating the EXECUTE pushbutton 56 which causes sequencing counter 126 to count up to one and thus initiate the transfer of data from the first program panel 32 to buffer 128.

The numerical control system then carries out the required positioning operation. After this position has been reached, the machine operator carries out the desired machining operation and is ready for the next positioning step. This is commenced when the operator depresses a REMOTE EXECUTE pushbutton 127 which causes the sequencing counter 126 to count up to two and transfer the positioning information from the second program panel 34 to buffer 128. Each step in the sequence can be carried out in this way.

Prior to operation, of course, the various program panels 32, 34, 36 are preset to indicate the positions, etc., of the various steps in the machining cycle. Before operation commences, the sequencing counter 126 begins at zero and is thus ready to commence the programming cycle. This is done, for example, by depressing the EXECUTE pushbutton 56. For the sake of simplicity, the EXECUTE pushbutton 56 is shown connected to some source of a logic signal equivalent to logic "one" so that the output of the EXECUTE pushbutton is a logic "one" whenever the pushbutton is closed with the understanding that the output is a logic "zero" whenever the pushbutton is not depressed.

The EXECUTE pushbutton 56 is connected to the UP input terminal of the sequencing counter 126 so that depressing the EXECUTE pushbutton causes the sequencing counter to advance one count and, at the beginning of operation, step from zero to one. At this point the first program panel for sequence number one (program panel 32) is activated. The digital data contained therein are thus relayed to some type of buffer storage means 128. The particular details of the transfer circuit or of buffer 128 will be apparent to those of ordinary skill in the art and need not be shown in detail herein except to say that when sequencing counter 126 steps to number one, the digital data stored in program panel 32 will be transferred to, and held in, buffer 128.

Under some circumstances the operator may wish to go back in the programming sequence to repeat or revise a particular step. This is done by depressing the BACK STEP pushbutton 129 which is connected to the DOWN input terminal of the sequencing counter 126.

Thus, the digital information indicative of the desired position of the controlled machine tool axis is at all times stored in buffer 128. Similarily, the present position of this same controlled machine tool axis is, as explained hereinbefore, held in the five digit reversible counter 128. One need only compare the contents of the five digit reversible counter 124 with the contents of the buffer 128 to be able to determine the type of controlled axis motion necessary to move the controlled machine tool axis to the desired position.

The bulk of this comparison is accomplished with a parallel b.c.d. adder/subtractor 130. The actual structure of the parallel b.c.d. adder/subtractor 130 is not of critical importance in the context of the present invention and it suffices to say that the function of this device is to compare the contents of the five digit reversible counter 124 with the contents of the buffer 128 and to generate an output signal indicating the distance and direction which the controlled axis must travel in order to arrive at the desired position. Though any circuit which performs these functions may be used within the context of the present invention, one such circuit can be constructed using National Semiconductor Corporation modules DM7283 and DM8283 as shown in National Semiconductor Corporation Application Note, AN-35, Apr. 1970.

Having determined the distance and direction desired to bring the controlled machine tool axis to the appropriate position, it is only necessary to take these signals and control the motion and speed of the controlled axis to accomplish the desired positioning step. There are a wide variety of drive systems which can be used in conjunction with numerical control systems of the type shown in the present invention. These drives include, but are not limited to, hydraulic drives using either hydraulic motors or pistons, electric motor drives of both the AC and DC type with a variety of approaches being used for controlling the speed during positioning including both step and proportional speed control systems. For the sake of simplifying the explanation herein, reference is made to the insert on FIG. 6 which shows an exemplary type of positioning approach. So long as the distance to go to the desired position is in excess of a certain amount, (the creep distance) the controlled axis travels at a rapid speed without regard to the actual distance to go. When the controlled axis gets within a certain relatively short distance from final position, the machine tool axis will be slowed to a relatively slow or "creep" speed.

An example of a drive system which can control positioning in this fashion is illustrated by way of a comparator 132, the CREEP switches 134, a "zero" detector 136, a four-way valve 138 and a creep valve 140. For the purposes of this example, it will be assumed that the creep valve 140 and the four-way valve 138 act to control the operation of a hydraulic cylinder (not shown) which is mechanically connected to the controlled axis.

The "direction" output of the parallel b.c.d. adder/subtractor circuit 130 is connected to the four-way valve 138 to establish the desired direction of controlled axis motion. If the desired position of the controlled axis (as indicated by the number stored in buffer 128) is greater than the present position (as indicated by the number stored in the five digit reversible counter 124), the "direction" output of the parallel b.c.d. adder/subtractor 130 will be a logic "zero." These output signals are fed, through appropriate amplifiers, etc. to the four-way valve 138 to assure travel in the appropriate direction.

So long as the difference between actual machine position and desired position exceeds a predetermined amount (i.e. the creep distance) the controlled machine axis will travel toward the desired position at a relatively high positioning rate as shown graphically by the insert of FIG. 6. The creep distance will necessarily vary depending upon the type and construction of the controlled machine tool. For this reason, the creep distance is established by the settings of the CREEP switches 134 which are set to maximize positioning speed while retaining the desired degree of positioning accuracy. The CREEP switches 134 determine the creep distance, say 0.050 inch from the desired position.

In order to change from positioning speed to creep speed the CREEP switches form one input to a comparator 132. The other input to comparator 132 comes from the "distance" output of parallel b.c.d. adder/subtractor 130. As was explained hereinbefore, the "distance" output of adder/subtractor 130 indicates the distance from the present position of the controlled axis to the desired position. The two inputs to comparator 132 are compared therein and the output of Q remains at logic "zero" so long as B (the distance to go) exceeds A (the creep distance).

The output Q of comparator 132 changes from logic "zero" to logic "one" when the distance to go (input B) becomes less than the creep distance (input A). That is, when A is greater than B output Q becomes a logic "one."

Output Q of comparator 132 is thus connected to the creep valve 140. When output Q becomes a logic "one" creep valve 140 is activated to reduce positioning speed to creep speed.

The controlled machine axis thus travels at creep speed until the actual position is within some predetermined distance of desired position, say 0.001 inch. This condition is determined by the "zero" detector 136. The "distance" output of parallel b.c.d. adder/subtractor 130 is connected to the "zero" detector 136. In its simplest form, the "zero" detector 136 can be a series of logic gates which are connected so as to detect the number 00000 out of parallel b.c.d. adder/subtractor 130. In more complex control systems, the "zero" detector 136 may be constructed like the CREEP switches 134 and the comparator 132 so as to provide for adjustment of the zero zone.

It should be emphasized that the drive system of FIG. 6 is exemplary only. It will be apparent to those of skill in the art that any of several types of drive systems could be utilized in the numerical control system of the present invention. There are certain advantages of cost, simplicity and performance inherent in the illustrated drive system. However, different drive systems can be used to advantage for certain types of machines which due to size, etc. do not operate at maximum proficiency with a hydraulic drive package.

Although the invention has been described with respect to a particular embodiment, the principles underlining this invention will suggest many additional modifications of this particular embodiment to those skilled in the art. Therefore, it is intended that the appended claims shall not be limited to the specific embodiments described, but rather shall cover all such modifications as fall within the true spirit and scope of the invention.

What is claimed as new and desired to be secured by Letters Patent of the United States is:

1. A numerical control system for positioning a machine tool along at least one axis of movement by moving said tool from a start position along said axis to a desired position, said system comprising movement sensing means operative to sense direction of movement of said machine tool and distance of movement in increments from said start position, said movement sensing means operating to provide a first output signal indicative of said direction of movement and a second output signal for every increment of distance traveled by said machine tool from said start position, actual position indicating means connected to receive said first and second output signals from said movement sensing means and operative to derive therefrom a digital value indicative of the present position of the machine tool along said axis, a plurality of program panel means for providing a sequence of numerical control data for moving said machine tool to a sequence of desired positions along said axis, each of said program panel means including at least one control data set means which may be manually operated to preset a digital value therein indicative of a desired position along said axis, said control data set means operating upon receipt of an activating signal to provide a digital output signal indicative of the digital value preset therein, sequencing means for sequentially activating the control data set means of said plurality of program panel means, adder/subtracter means operatively connected to said actual position indicating means and to said program panel means, said adder/subtractor means operating to compare the digital output signal from said control data set means with the digital value indicative of the present position of the machine tool from said actual position indicating means and to generate a first digital output signal indicative of the distance from the machine tool to the desired position and a second output signal indicative of the direction for the machine tool to travel to the desired position and drive means operatively connected to receive said first and second output signals from said adder/subtractor means, said drive means operating to control the positioning of said machine tool along said axis.

2. The numerical control system of claim 1 wherein said actual position indicating means includes reversible up/down counter means having a count input connected to receive the second output signals from said movement sensing means and a direction of count input connected to receive the first output signals from said direction sensing means, said reversible up/down counter means operating to count in a direction controlled by said first output signal from said movement sensing means to register a count in response to the second output signal from said movement sensing means.

3. The numerical control system of claim 2 wherein said reversible up-down counter means includes a reset input, said reversible up/down counter means being operative in response to an input signal at said reset input thereof to zero the count indication registered thereby.

4. The numerical control system of claim 3 which includes zero means connected to selectively supply a reset signal to the reset input of said reversible up/down counter means to provide a new start position for said machine tool.

5. The numerical control system of claim 4 wherein said sequencing means includes sequencing reversible counter means having a count up input and a count down input, said sequencing reversible counter means having a plurality of outputs, each output being individually connected to provide an actuating signal to one of said program panel means, said actuating output signal being provided by said sequencing reversible counter means upon the registration thereby of a predetermined count corresponding to a specific one of said plurality of outputs.

6. The numerical control system of claim 5 which includes pulse input means connected to the up input of said sequencing reversible counter means to provide sequencing pulses thereto, said sequencing reversible counter means operating to register an increasing count in response to said sequencing pulses, and backstep pulse means connected to the down input of said sequencing reversible counter means, said backstep input means operative to provide an input signal to cause said sequencing reversible counter means to count down and register a decreasing count, said decreasing count causing an activating signal to be sent to reactivate a previously activated program panel means.

7. The numerical control system of claim 1 wherein said drive means includes creep distance control means for generating a creep position signal indicative of a predetermined creep position and comparator means operatively connected to said creep distance control means and said parallel adder/ subtractor means for comparing said first digital output signal from said parallel adder/subtractor means with said creep position signal, said comparator means being operative when said first digital output signal reaches a desired relationship with said creep position signal to provide a creep control signal, said drive means operating in response to said creep control signal to reduce the speed of movement of said machine tool along said axis.

8. The numerical control system of claim 6 wherein said drive means includes zero detector means operatively connected to said parallel adder/subtractor means for determining when said first digital output signal reaches zero and creep distance control means for generating a creep position signal indicative of a predetermined creep position and comparator means operatively connected to said creep distance control means and said parallel adder/subtractor means for comparing said first digital output signal from said parallel adder/subtractor means with said creep position signal, said comparator means being operative when said first digital output signal reaches a desired relationship with said creep position signal to provide a creep control signal, said drive means operating in response to said creep control signal to reduce the speed of movement of said machine tool along said axis.

* * * * *